(12) United States Patent
Kalinowski

(10) Patent No.: US 11,685,417 B2
(45) Date of Patent: Jun. 27, 2023

(54) ADJUSTABLE SPAN TINE PALLET JACK

(71) Applicant: Rehrig Pacific Company, Los Angeles, CA (US)

(72) Inventor: Dane Gin Mun Kalinowski, Foothill Ranch, CA (US)

(73) Assignee: Rehrig Pacific Company, Los Angeles, CA (US)

( * ) Notice: Subject to any disclaimer, the term of this patent is extended or adjusted under 35 U.S.C. 154(b) by 0 days.

(21) Appl. No.: 17/583,405

(22) Filed: Jan. 25, 2022

(65) Prior Publication Data
US 2022/0250670 A1 Aug. 11, 2022

Related U.S. Application Data

(60) Division of application No. 17/226,194, filed on Apr. 9, 2021, now Pat. No. 11,260,890, which is a continuation of application No. 16/800,169, filed on Feb. 25, 2020, now Pat. No. 10,988,155.

(60) Provisional application No. 62/884,000, filed on Aug. 7, 2019, provisional application No. 62/810,308, filed on Feb. 25, 2019.

(51) Int. Cl.
*B62B 3/06* (2006.01)
*B66F 7/06* (2006.01)
*B66F 9/12* (2006.01)

(52) U.S. Cl.
CPC .............. *B62B 3/0625* (2013.01); *B62B 3/06* (2013.01); *B62B 3/0618* (2013.01); *B66F 7/0641* (2013.01); *B66F 9/12* (2013.01); *B62B 3/0612* (2013.01); *B62B 2203/10* (2013.01); *B62B 2203/20* (2013.01); *B62B 2301/02* (2013.01)

(58) Field of Classification Search
CPC ....... B62B 3/0618; B62B 3/06; B62B 3/0625; B62B 3/0612; B62B 2203/10; B62B 2203/20; B62B 2301/02; B66F 7/0641; B66F 9/12
USPC ........................................................ 280/43.12
See application file for complete search history.

(56) References Cited

U.S. PATENT DOCUMENTS

| | | | | |
|---|---|---|---|---|
| 3,265,158 A * | 8/1966 | Constable | ............. | B62B 3/0612 187/232 |
| 4,969,794 A * | 11/1990 | Larsen | .................. | B62B 3/0618 280/43.12 |
| 6,021,869 A * | 2/2000 | Fischer | ...................... | B62B 3/06 187/233 |
| 7,641,011 B2 * | 1/2010 | Fridlington, Jr. | ..... | B62B 3/0618 180/68.5 |
| 8,668,208 B2 * | 3/2014 | Larringan Errasti | ..... | B62B 3/06 280/43.23 |
| 9,714,047 B1 * | 7/2017 | Shunli | ..................... | B62B 3/001 |
| 2006/0181039 A1 * | 8/2006 | Fridlington, Jr. | ..... | B62B 3/0618 280/43.12 |

(Continued)

*Primary Examiner* — James A Shriver, II
*Assistant Examiner* — Hilary L Johns
(74) *Attorney, Agent, or Firm* — Carlson, Gaskey & Olds, P.C.

(57) ABSTRACT

A pallet jack includes a base and a pair of tines extending from the base. The pair of tines including a first tine and a second tine. A load wheel supports an outer end of each of the pair of tines. Each load wheel is configured to move toward and away from the respective tine to raise the tine off a floor on which the load wheel is supported. The first tine including a support surface configured to selectively be a lowermost surface of the tine to facilitate lateral displacement of the first tine.

14 Claims, 27 Drawing Sheets

(56) References Cited

U.S. PATENT DOCUMENTS

2016/0368747 A1* 12/2016 O'Connell .............. B66F 9/065

* cited by examiner

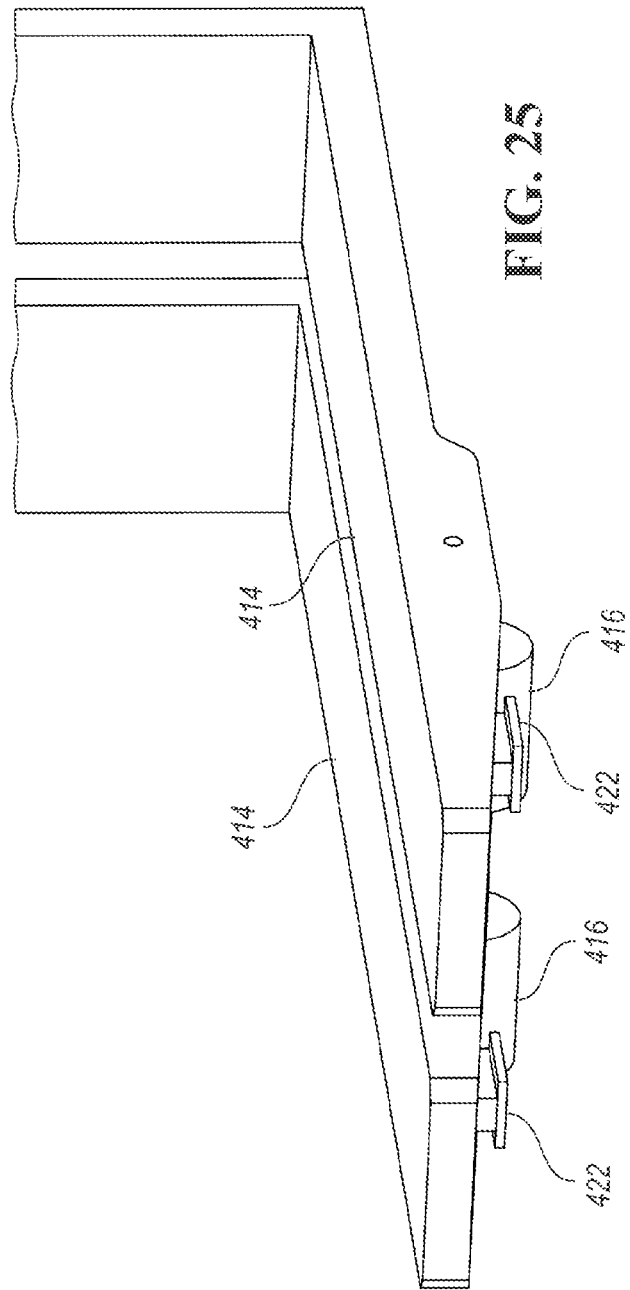

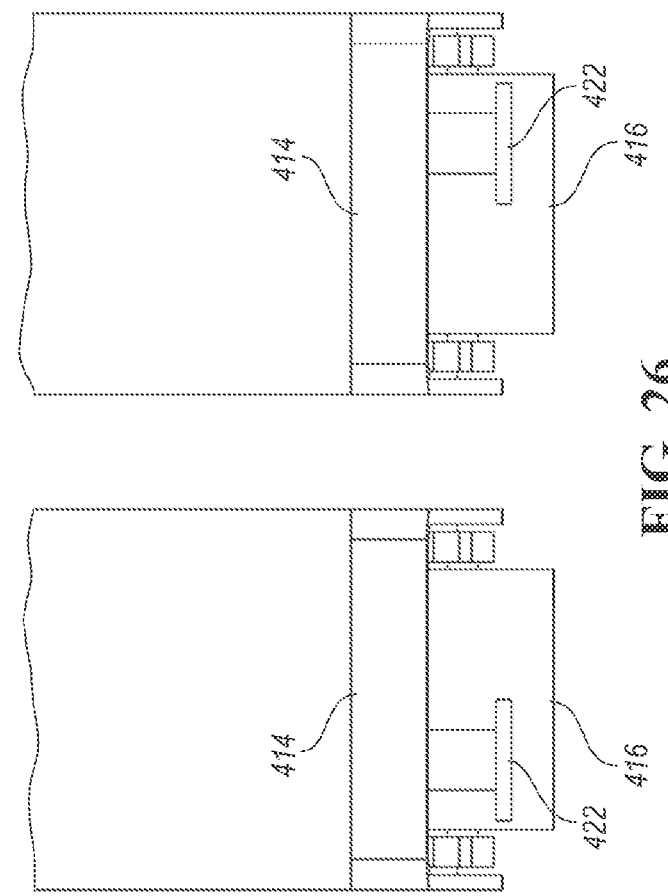

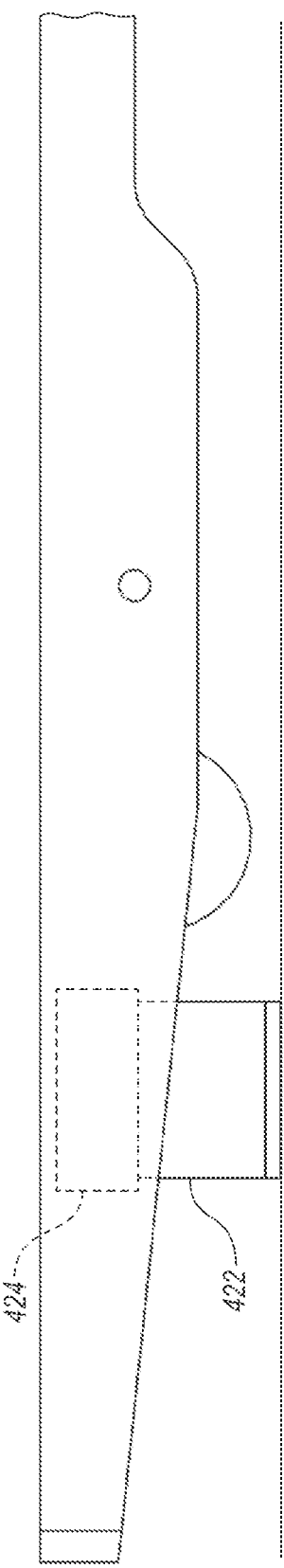

US 11,685,417 B2

ADJUSTABLE SPAN TINE PALLET JACK

BACKGROUND

Methods and mechanisms currently exist on the market to allow for fork tines on a manual pallet jack to be adjusted inward or outward. Adjusting the tine spacing gives the jack compatibility with multiple pallet sizes. This currently exists with manual adjustments (e.g. bolting and unbolting, hand crank) on a manual pallet jack.

A similar fork tine adjustment is also available to fork lifts where fork positions can be manually adjusted on the carriage with pins. However, this cannot be done on a pallet jack with adjustable span fork tines that are adjusted without being removed first. Adjustable span fork tines would wear the load wheels under the tines by dragging them sideways or requiring a large amount of space to move the equipment back and forth while making the adjustment. The load wheels under the tines are typically just wheels (i.e. not casters with a swivel motion) that spin either forward or backward. The side motion of the adjustable tines would drag the wheels across the ground, potentially causing wear, flat spots on the wheel tread, damage to the floor, and ultimately premature load wheel failure. The load wheels carry the majority of the pallet weight when lifting and transporting palletized goods. The additional drag caused by the side motion of the load wheels could also prevent the tine from expanding to the desired spacing.

One option for completing the fork tine span adjustment is moving the equipment in forward or reverse while making the adjustment. This allows the load wheels to roll but increases complexity as the operator needs a large amount of available space to complete the adjustment and is required to not only move the equipment but adjust at the same time. There is unlikely to be the required amount of space in the back of a trailer and it would be cumbersome to remove the lift from the trailer to make the adjustment on the road then go back for the product.

SUMMARY

A pallet jack includes adjustable span fork tines and side-motion mechanism for reducing friction between the tines and the floor during lateral movement. The pallet jack may include side wheels that can be selective deployed under the tines to facilitate lateral motion of the tines toward and away from one another. The side wheels may be deployed by the same deployment mechanism as the load wheels, or the side wheels may have an independent deployment mechanism. Alternatively, instead of side wheels, slides comprising a reduced friction material may be deployable under each tine to facilitate sliding of the tines toward and away from one another. Each side wheel or slide provides a support surface configured to selectively be the lowermost surface of the tine to facilitate lateral displacement of the first tine.

BRIEF DESCRIPTION OF THE DRAWINGS

FIG. 25 shows tines according to a fifth embodiment that can be used in the pallet jack of FIG. 1.

FIG. 26 is a front view of the tines of FIG. 25.

FIG. 27 shows the tines of FIG. 26 with the side glider in a deployed position.

DETAILED DESCRIPTION

Figure 1:
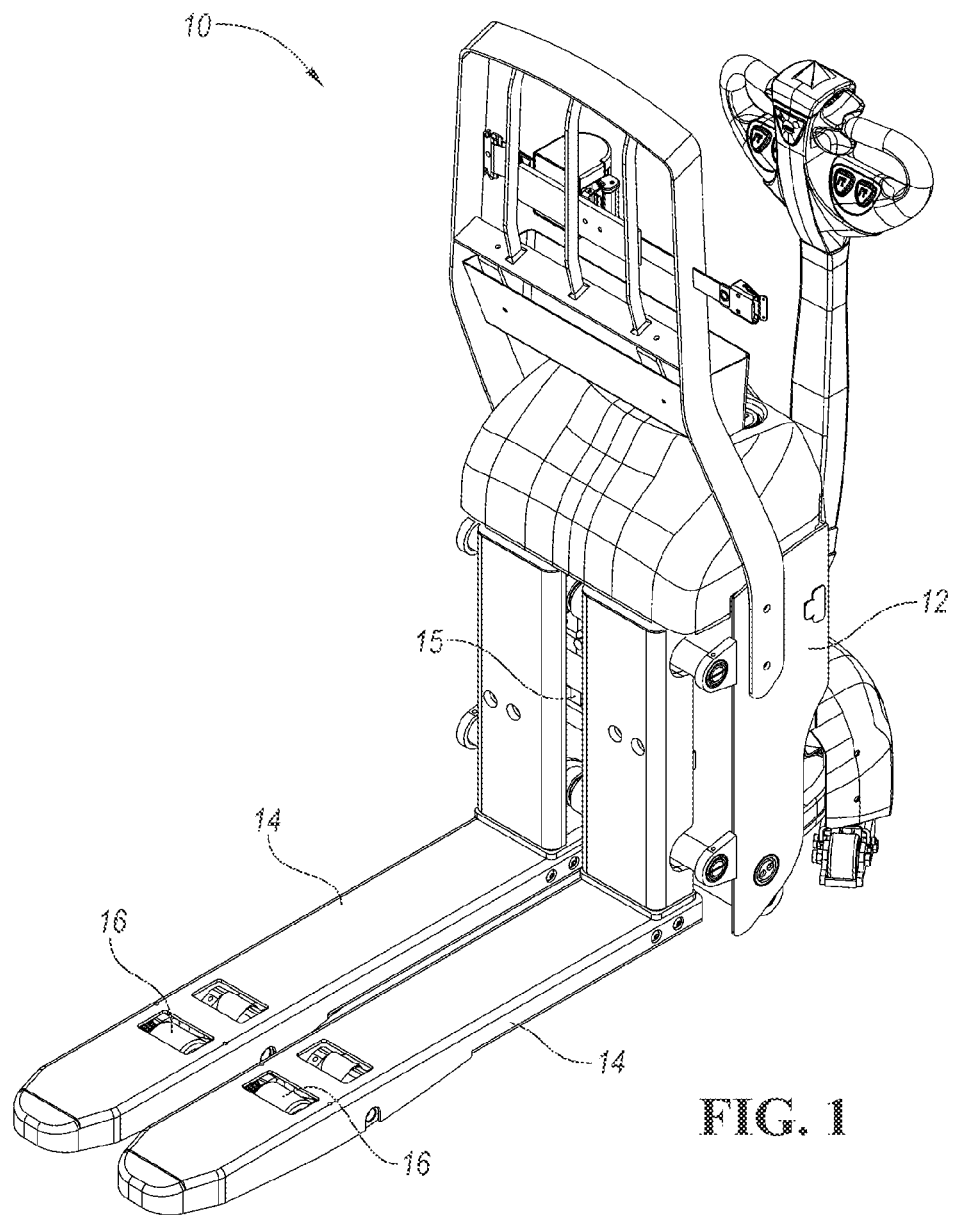
FIG. 1 is a perspective view of a pallet jack according to a first embodiment.

A pallet jack 10 is shown in FIG. 1. The pallet jack 10 includes a lift module or base 12 containing the lift mechanisms and the tine spacing actuators 15. The base 12 is connected to a pair of fork tines 14. The base 12 can raise and lower the fork tines in a known manner, by leveraging the load wheels 16 supporting the tines 14, such as by hydraulics, pneumatics, electric motors, or via a manual actuator. The base 12 can also move the tines toward and away from one another with the tine spacing actuators 15, which could be hydraulics, pneumatics, electric motors driving a ball screw or a threaded rod, or via a manual actuator.

The pallet jack mechanism could be semi-electric, e.g. electric drive system and manual lifting (via pumping the tiller arm) or full-electric, e.g. electric drive system and electric lifting/lowering. In this example, the lift is semi- or full-electric, so battery power exists on the equipment to drive the actuators whether it be an electric hydraulic pump or electric motor. Other power sources could be provided, including manual.

The pallet jack 10 according to the first embodiment provides a first mechanism for facilitating the adjustment of the tine spacing without dragging the load wheels 16. The pallet jack 10 according to first embodiment is shown in FIGS. 1-11.

Figure 2:
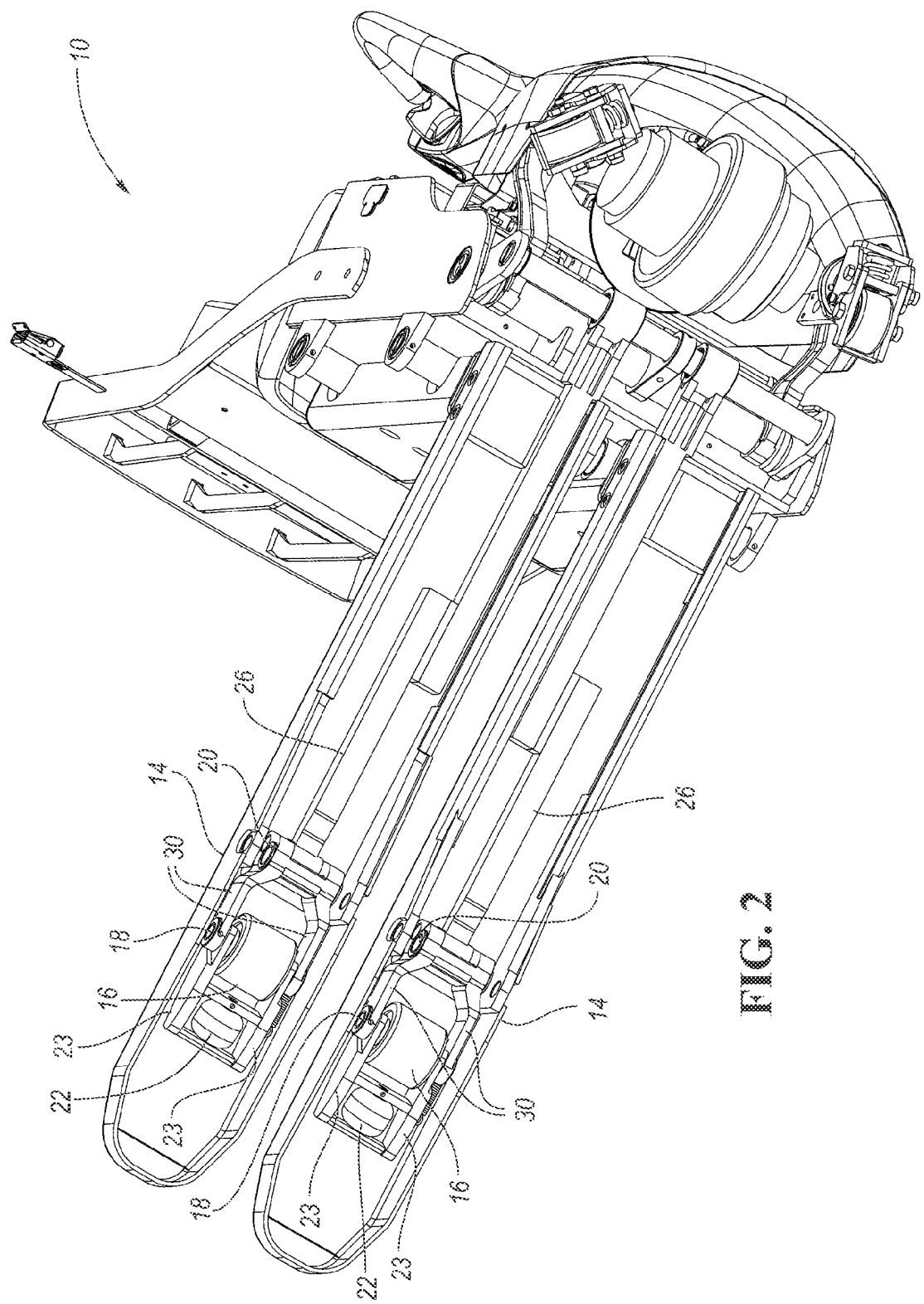
FIG. 2 is a perspective view of the underside of the pallet jack of FIG. 1.

FIG. 2 is a perspective view of the underside of the tines 14 of FIG. 1. Each tine 14 includes a load wheel 16 which is rotatable on an axis 18 perpendicular to the long axis of the tine 14. The load wheel axis 18 is mounted at the end of a pair of arms 30 which are pivotable about an axis 20 fixed to the tine 14. The axis 20 is spaced rearwardly of the axis 18, and also perpendicular to the long axis of the tine 14. A side wheel 22 is mounted to arms 23 extending forwardly of the load wheel 16 and is oriented in a direction such that its axis is transverse to the load wheel axis 18. The arms 23 are pivotable about the axis 18 (but could alternatively pivot about an axis parallel to that load wheel axis 18) in a vertical plane parallel to the long axis of the tine 14.

As explained below, the side wheel 22 can facilitate lateral motion of the tine 14. A push rod 26 within each tine 14 pivots the arms 30 to deploy and retract the load wheels 16, in a known manner.

Figure 3:
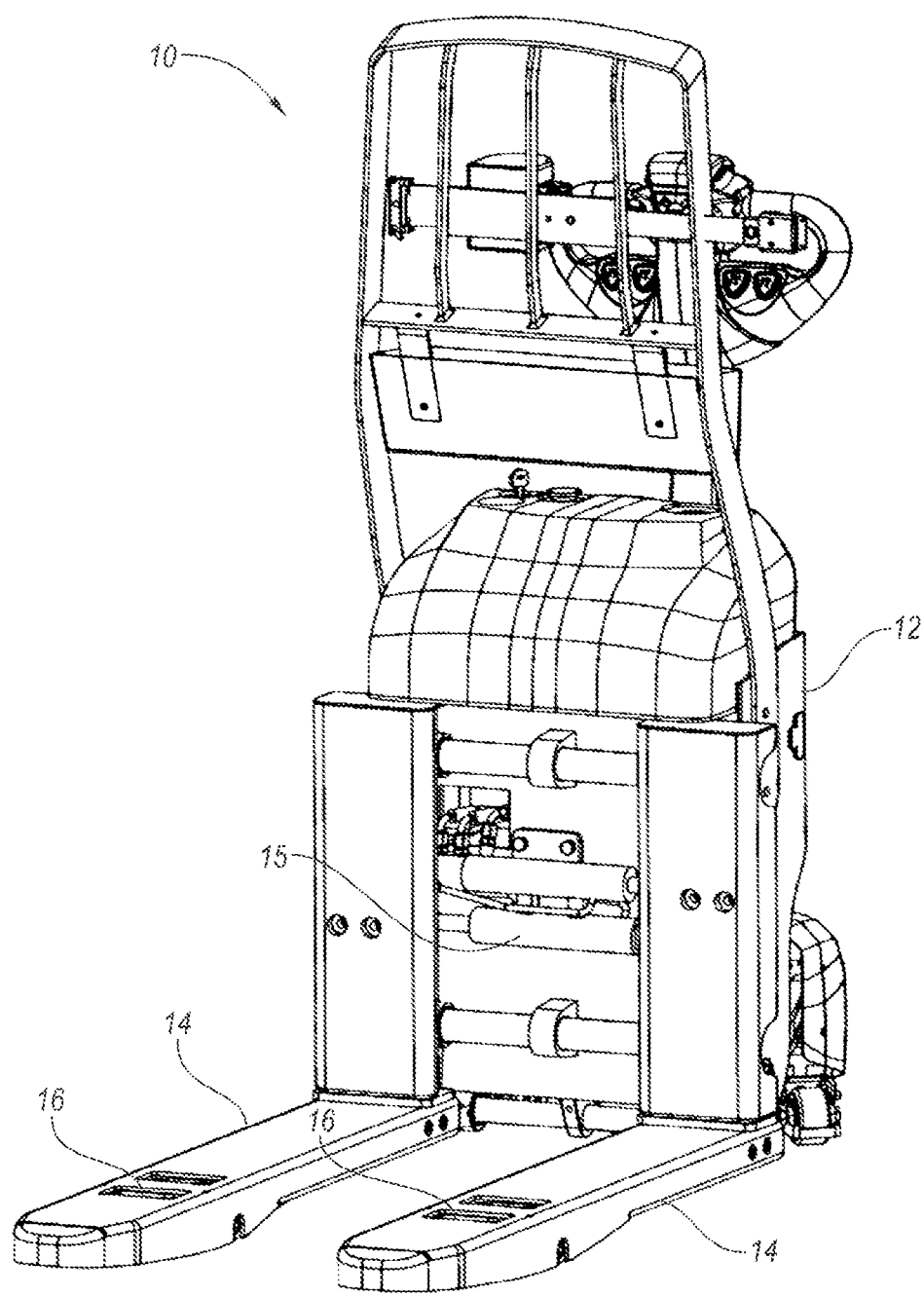
FIG. 3 shows the pallet jack of FIG. 1 with the tines in the spaced apart position.

In FIGS. 1 and 2, the tines 14 of the pallet jack 10 are spaced closed to one another. In FIG. 3, the tines 14 are spaced further apart. The actuators 15 for moving the tines 14 toward and away from each other are shown on the base 12. As will be explained below, the side wheels 22 permit the tines 14 to be moved toward and away from each other without dragging the load wheels 16 parallel to their axes 18, which could cause damage to the load wheels 16 and/or the floor.

Figure 4:
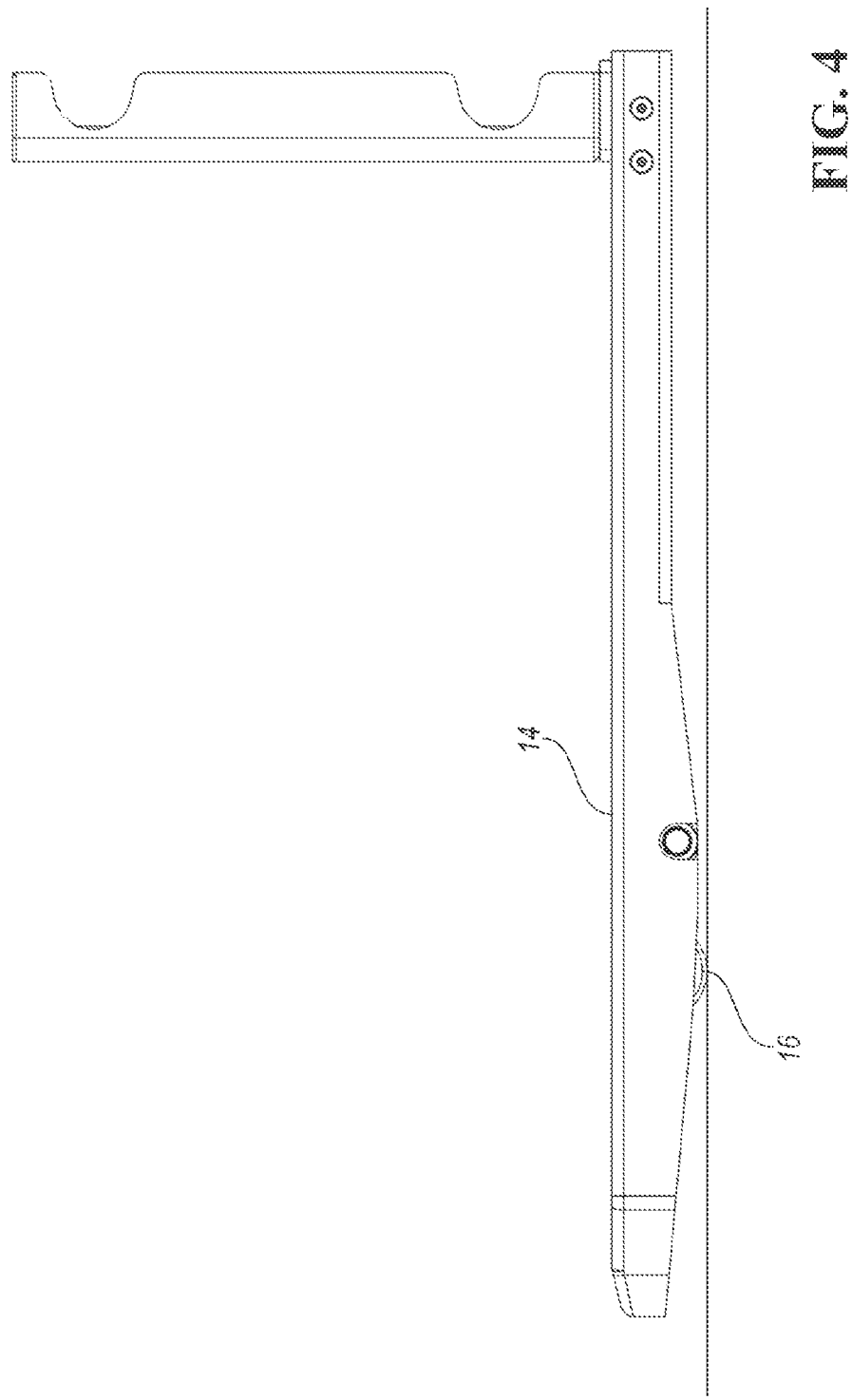
FIG. 4 is a side view of the tines of the pallet jack of FIG. 3.

FIG. 4 shows a side view of the tines 14 (without the base 12, for simplicity) in the low position with the load wheels 16 retracted into the tine 14 as much as possible. In this position, the tines 14 are closest to the floor and can be slid under a pallet.

Figure 5:
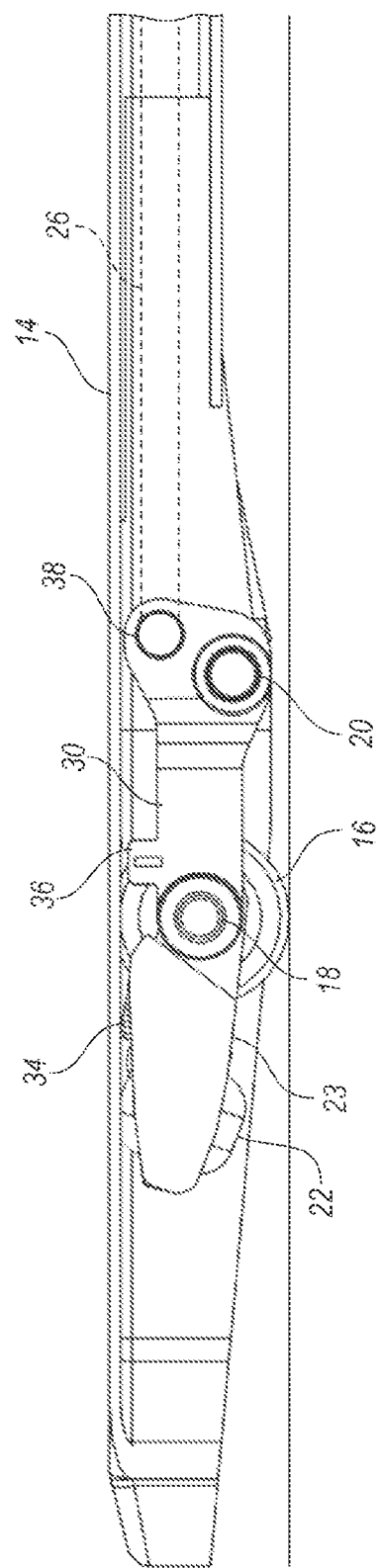
FIG. 5 shows one of the tines of FIG. 4, partially broken away.

FIG. 5 is a view similar to FIG. 4, with part of the tine 14 broken away for illustration. The load wheel 16 is rotatable on the axis 18 at the end of the arm 30 which pivots about an axis 20 that is fixed to the tine 14. The push rod 26 is pivotably secured to a rearward portion 38 of the arm 30 at a pivot point that is rearward and upward of the axis 20. In a generally known manner, the push rod 26 can, by forward motion, cause the load wheel 16 to deploy downward and lift the tine 14. By rearward motion, the push rod 26 causes the load wheel 16 to retract upward into the tine 14, lowering the tine 14 relative to the floor. The arms 30 each include a stop 36 projecting upward from a point rearward of the load wheel axis 18.

Still referring to FIG. 5, stretching the springs 34 permits the load wheels 16 to move closer to the underside of the tines 14 by permitting rotation of the arms 23 downward away from the arms 30 to the position where both the arms 23 and the arms 30 are substantially horizontal. In FIG. 5, the springs 34 are stretched.

Figure 6:
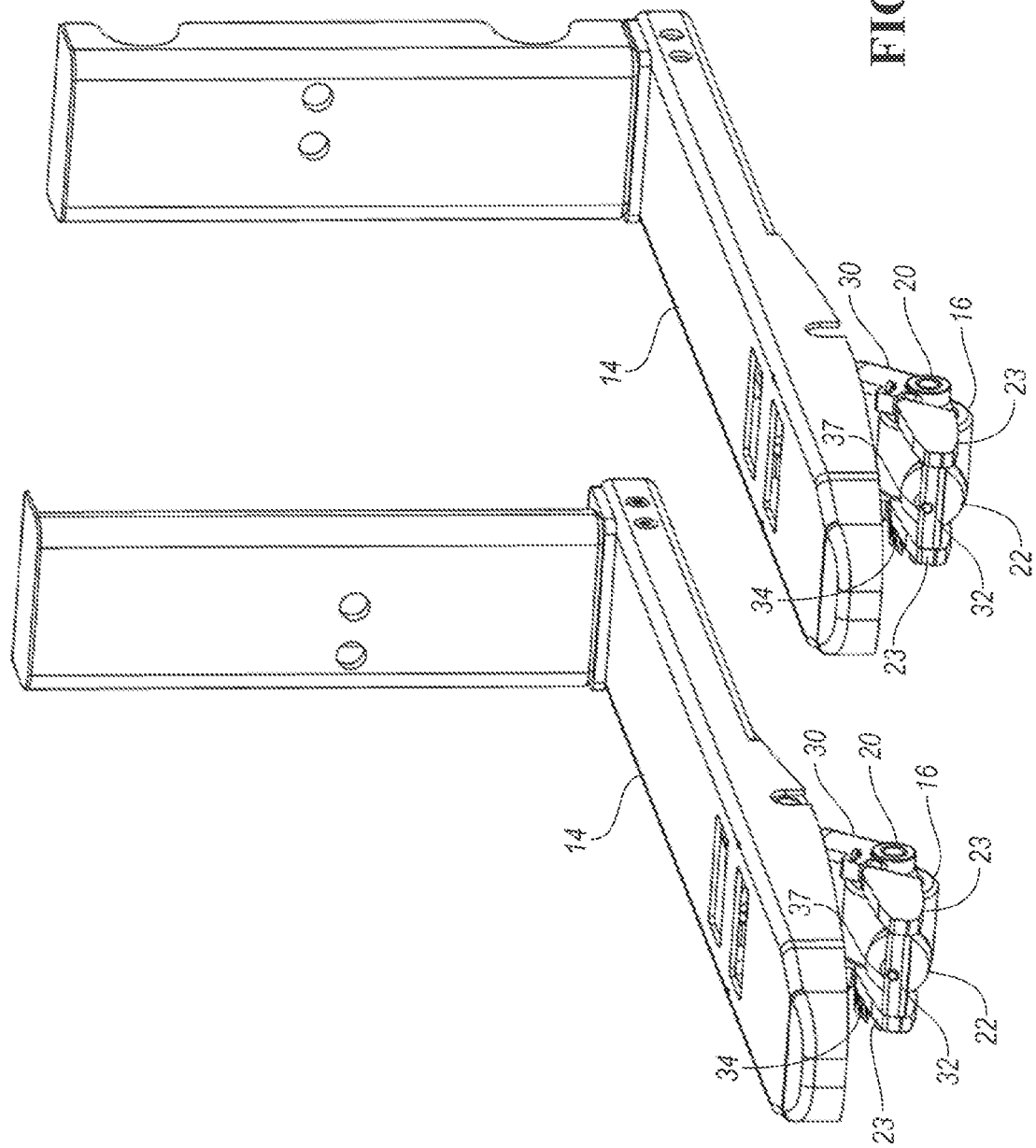
FIG. 6 shows the tines of the pallet jack of FIG. 3 raised to the lift position.

FIG. 6 shows the tines 14 (the base 12 is again omitted for illustration) in a lifted or high position, such as would be used to lift a pallet off a floor and move the pallet. The arms 30 are pivoted downward, thereby moving the load wheels 16 away from the tines 14, causing the tines 14 to move away from the floor, with the load wheels 16 on the floor. As shown, a cross-bar 32 extends from the forward end of one arm 23 to the forward end of the other arm 23. The side wheel 22 is rotatable on an axle 37 extending to the cross-bar 32. A spring 34 connects one of the arms 30 to the corresponding arm 23 and biases the arm 23 upward rotationally toward the arm 30 and toward the tine 14.

Figure 7:
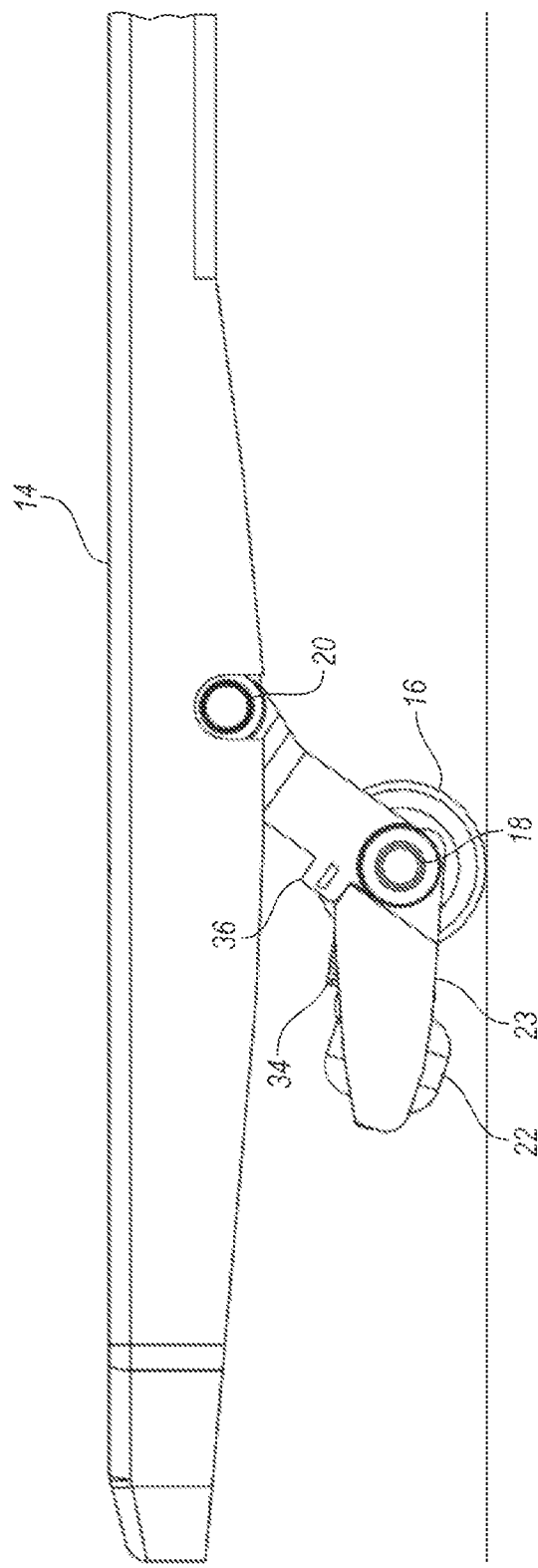
FIG. 7 is a side view of the tines of FIG. 7.
Figure 8:
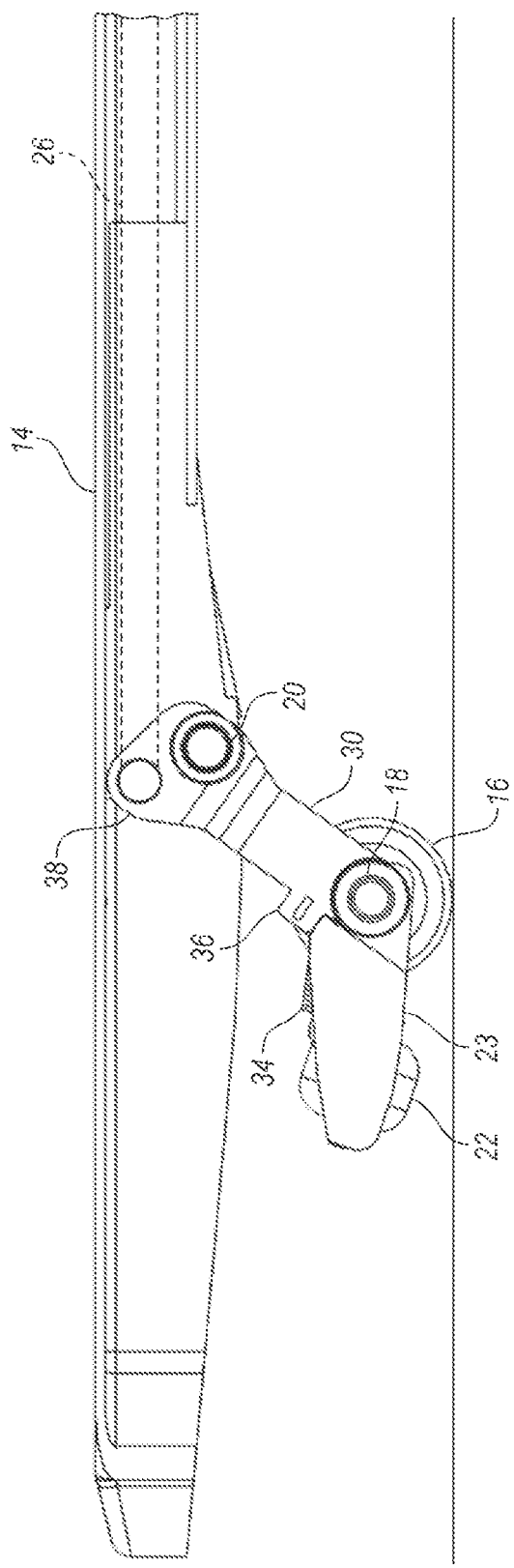
FIG. 8 shows the tine of FIG. 7 partially broken away.

FIG. 7 is a side view of one of the tines 14 of FIG. 6. FIG. 8 shows the tine 14 of FIG. 7 partially broken away.

Referring to FIGS. 7 and 8, the pushrod 26 is moved forward to a mid position, such that the arms 30 pivot downward about axis 20 until the load wheel 16 is moved to a lift position away from the tine 14 but the side wheel 22 is still spaced above the floor. As the arms 30 pivot downward away from the underside of the tine 14, the spring 34 is able to pull the arms 23 about the axis 18 upward toward the arms 30 (and toward the tine 14) until the arms 23 contact the stops 36 on the arms 30 (as shown in FIGS. 7 and 8). In this manner, the springs 34 hold the side wheels 22 off the floor in this high position.

Figure 9:
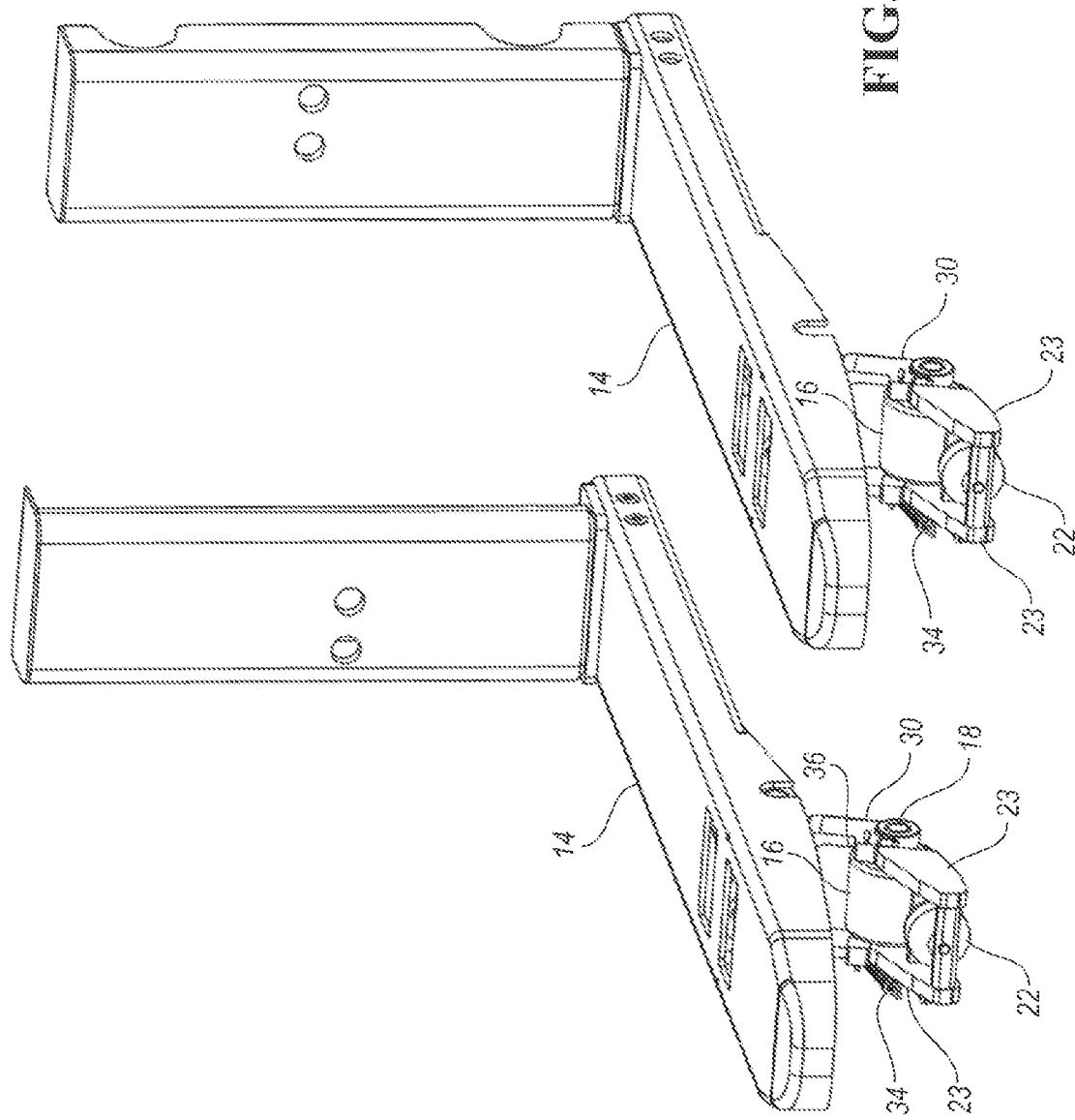
FIG. 9 shows the tines of the pallet jack of FIG. 3 in the side shifting position.
Figure 10:
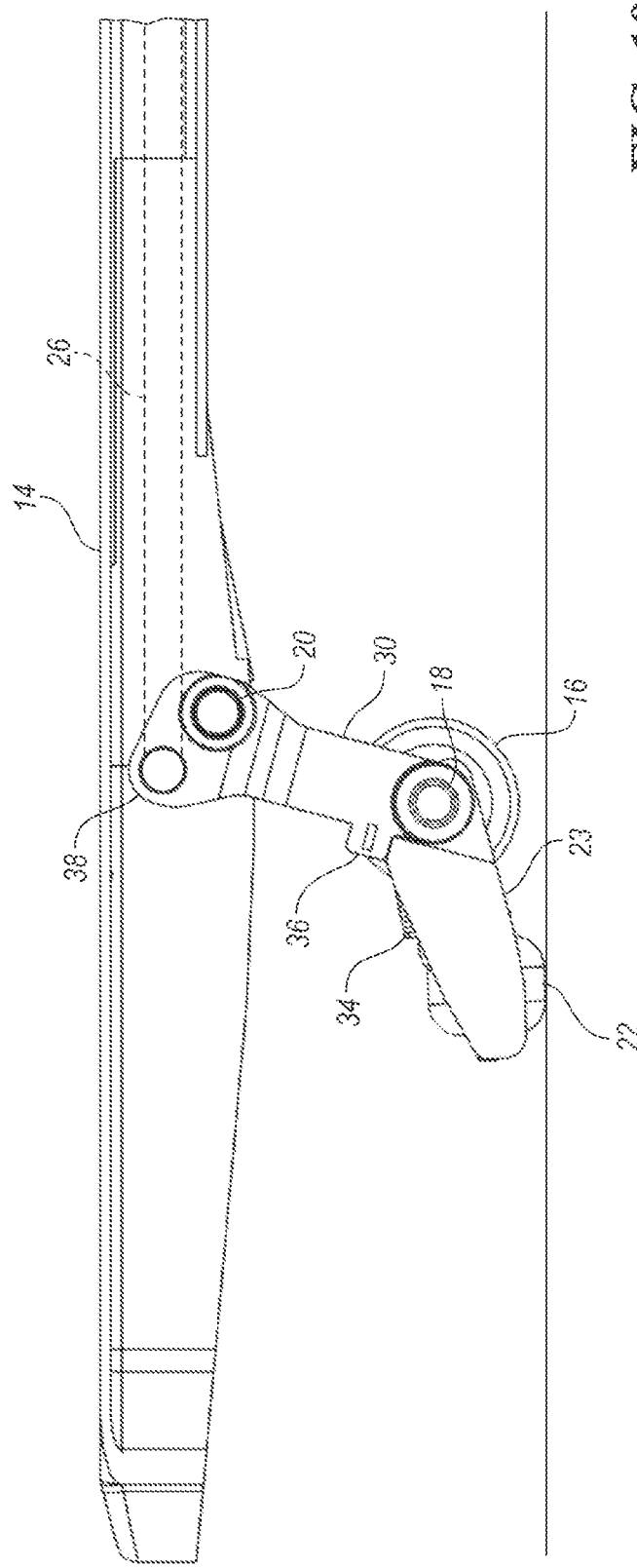
FIG. 10 shows one of the tines of FIG. 9, partially broken away.

FIG. 9 shows the tines 14 of the pallet jack 10 (FIG. 3) with the load wheels 16 and side wheels 22 moved to the side-shifting position, i.e. the side wheels 22 are in contact with the floor and the load wheels 16 are lifted off the floor. FIG. 10 shows one tine 14 of FIG. 9, partially broken away. The push rod 26 has been moved forward to its furthest forward position, rotating the arms 30 downward to a maximum degree. This also rotates the arms 23 further downward until the side wheels 22 contact the floor, then lifting the load wheel 16 off the floor, and lifting the tines 14 even a little higher (this would not be done while the tines 14 are loaded). Each side wheel 22 provides a support surface configured to selectively be the lowermost surface of the tine to facilitate lateral displacement of the first tine.

Figure 11:
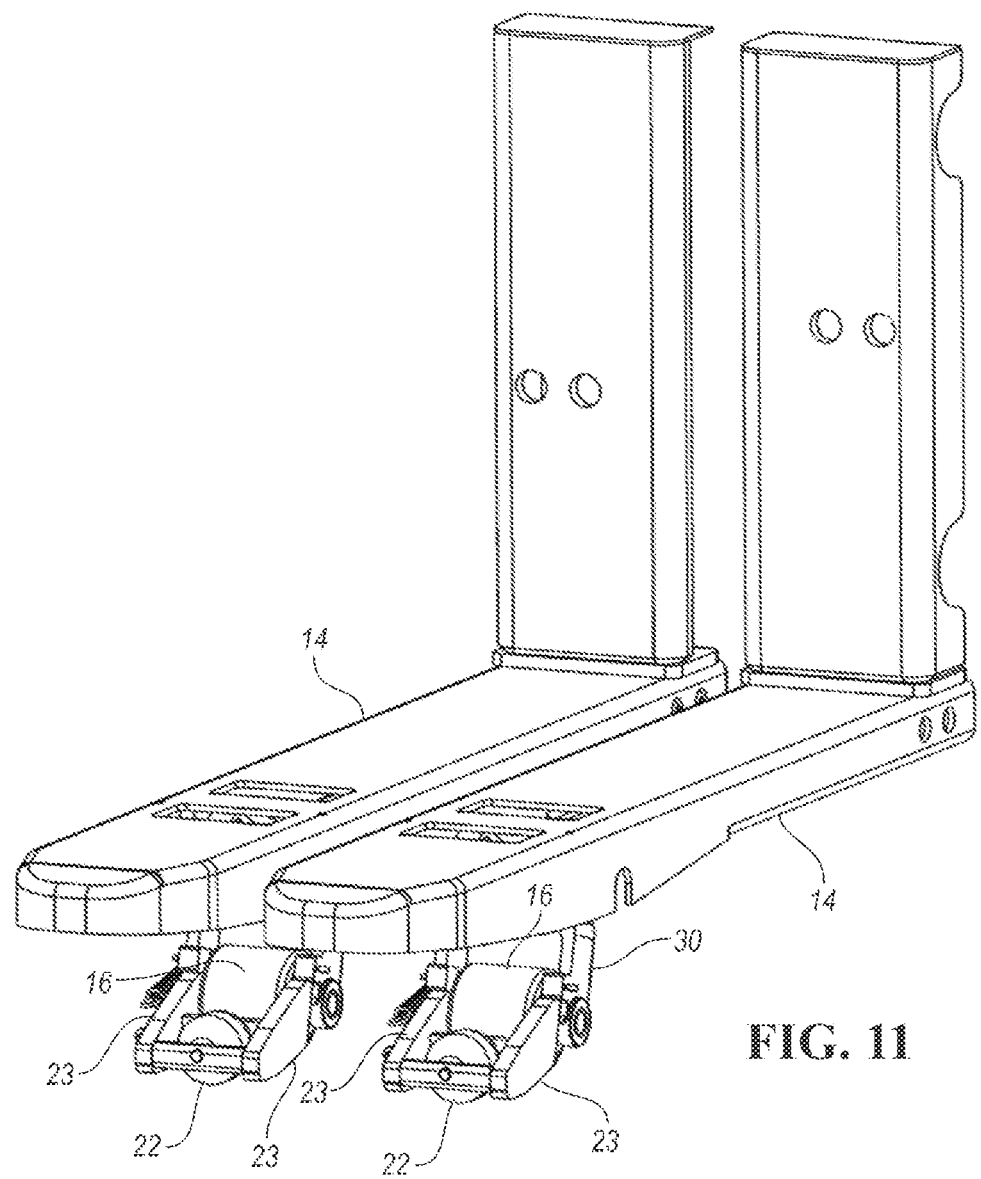
FIG. 11 shows the tines of the pallet jack of FIG. 3 with the tines in the side shifting position and the tines in the close position.

The tines 14 can then be moved back toward one another as shown in FIG. 11. The tines 14 would roll on the side wheels 22. With the load wheels 16 off the floor, movement of the tines 14 laterally does not damage the load wheels 16 or the floor. In this side-shifting position, the tines 14 can be moved laterally toward and away from one another. With the tines 14 closely-spaced near one another or spaced further apart from one another, the load wheels 16 and tines 14 can be moved back and forth between the lift position, the low position, and the side-shifting position.

Figure 12:
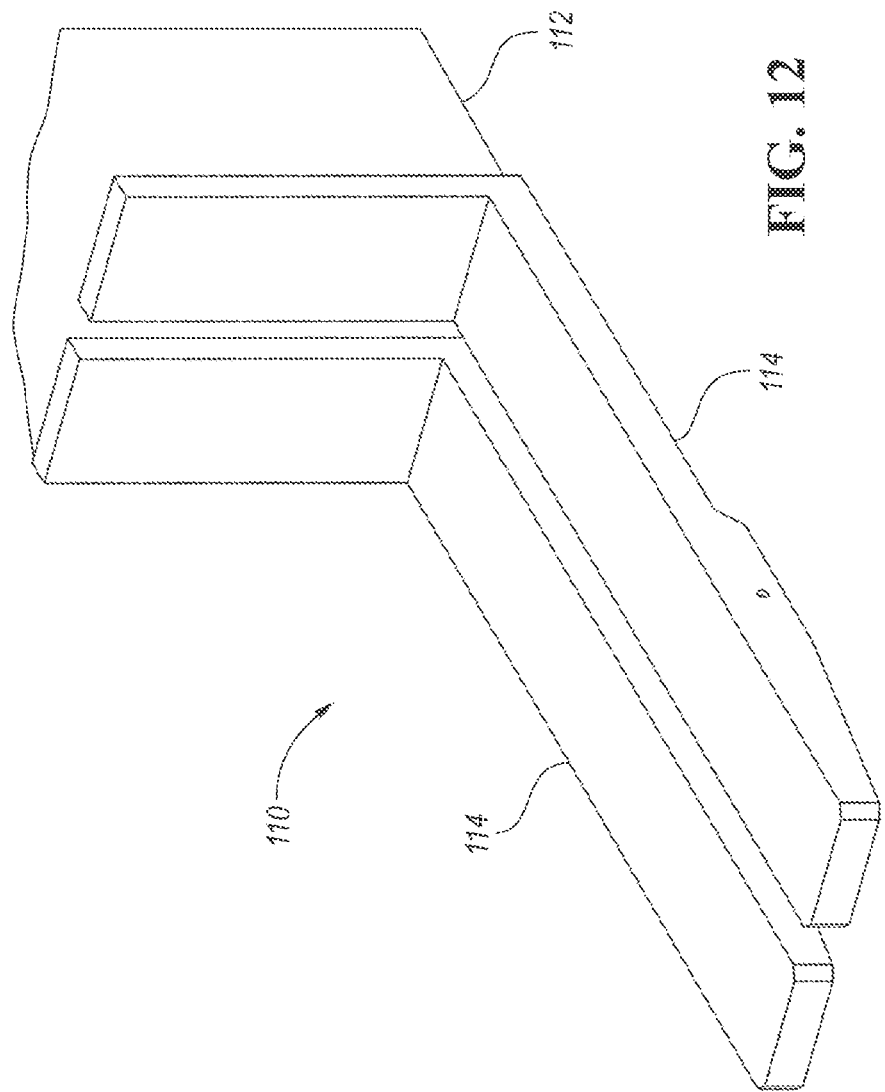
FIG. 12 is a schematic view of a pallet jack according to a second embodiment.

A pallet jack 110 according to a second embodiment is shown somewhat schematically in FIG. 12. The pallet jack 110 includes a base 112 containing the lift mechanisms and the tine spacing adjustment mechanisms, such as hydraulic actuators, electric motors, etc, which would be substantially the same as above. The base 112 is connected to a pair of fork tines 114. The base 112 can raise and lower the fork tines 114 in a known manner, including hydraulics, pneumatics, electric motors, or via a manual actuator, as in the first embodiment. The base 112 can also move the tines 114 toward and away from one another, which could also be accomplished through hydraulics, pneumatics, electric motors, or via a manual actuator, as in the first embodiment.

The pallet jack 110 provides a second mechanism for facilitating the adjustment of the tine 114 spacing without dragging the load wheels 116.

Figure 13:
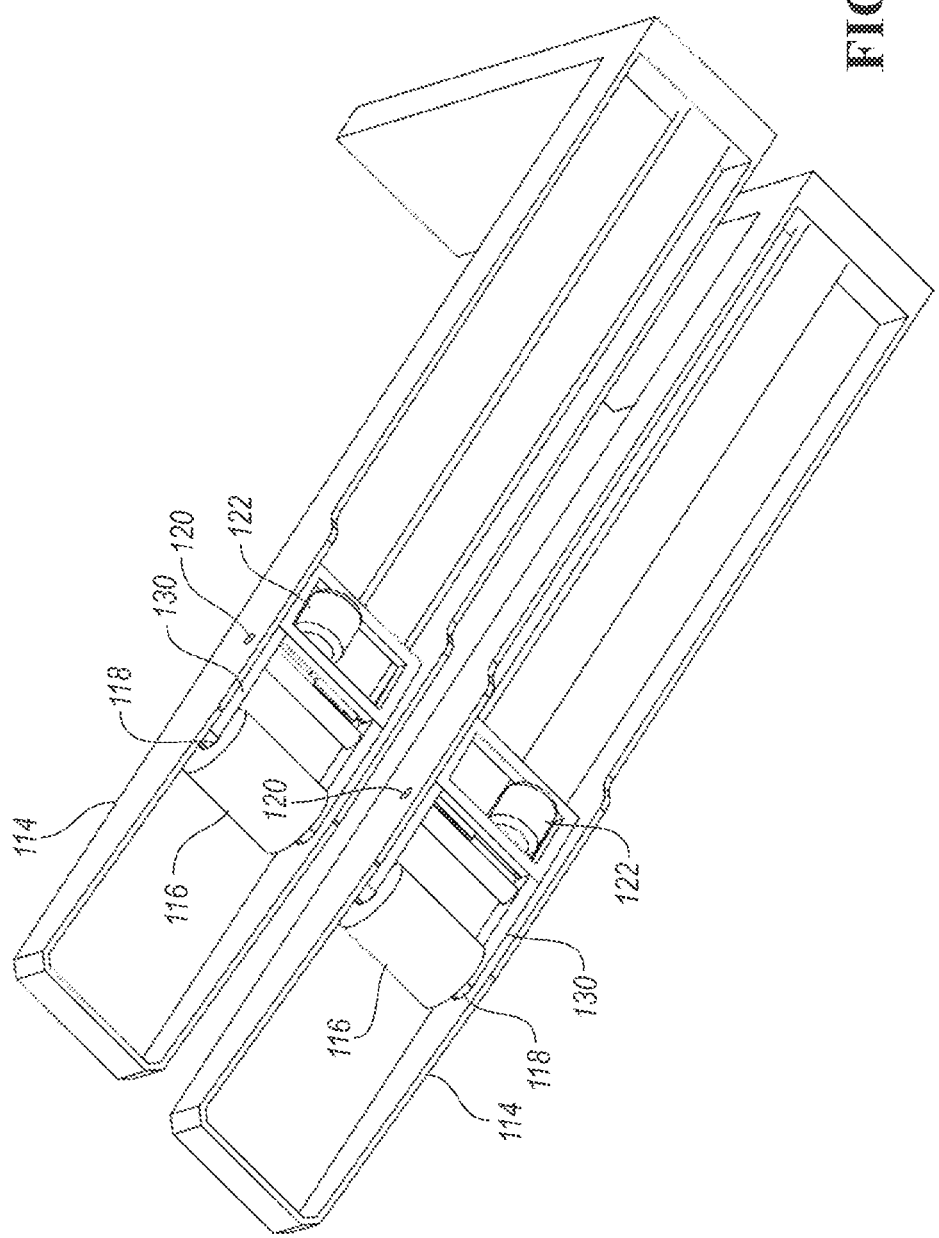
FIG. 13 is a perspective view of the underside of the tines of the pallet jack of FIG. 12.

FIG. 13 is a perspective view of the underside of the tines 114 of FIG. 12. Each tine 114 includes a load wheel 116 which is rotatable on an axis 118 perpendicular to the long axis of the tine 114. The load wheel axis 118 is mounted at the end of an arm 130 which is pivotable 120 about an axis 120 fixed to the tine 114. The axis 120 is spaced rearwardly of the axis 118, and also perpendicular to the long axis of the tine 114. A side wheel 122 is mounted rearwardly of the load wheel 116 and is oriented in a direction such that its axis is very roughly parallel to the long axis of the tine 114, i.e. such that the side wheel 122 can facilitate lateral motion of the tine 114 when pivoted downward.

Figure 14:
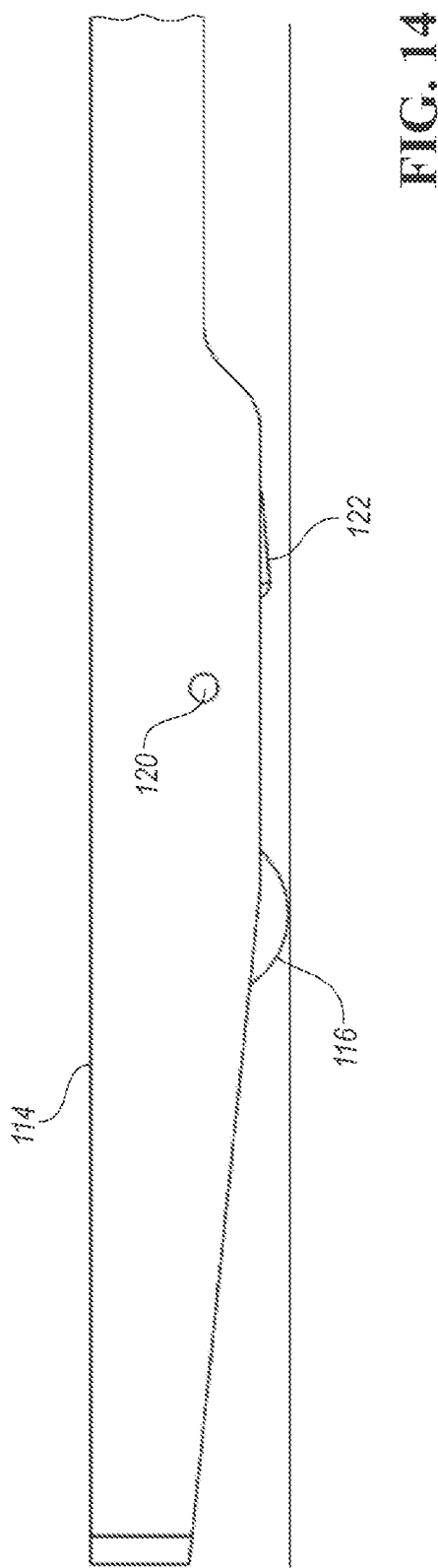
FIG. 14 is a side view of the tines of FIG. 13.

FIG. 14 is a side view of the tine 114. In FIG. 14, the load wheel 116 is in a low (not lifted) position, where it contacts the floor. The side wheel 122 is in a retracted position where it would not contact the floor.

Figure 15:
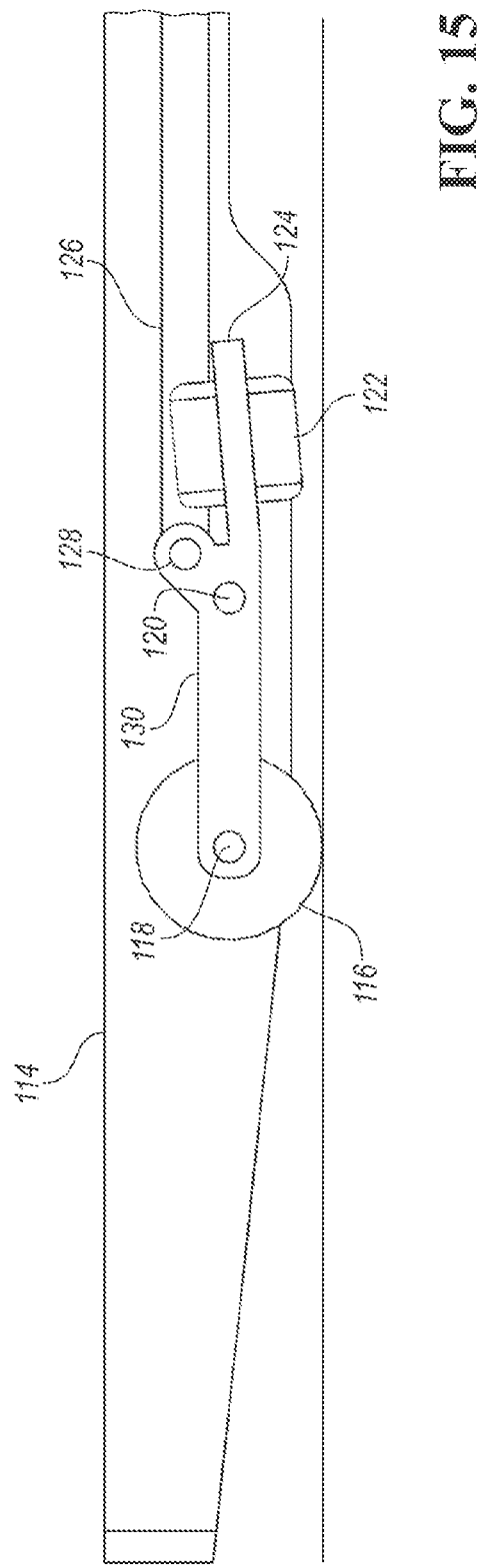
FIG. 15 shows one of the tines of FIG. 14, partially broken away.

FIG. 15 is a view similar to FIG. 14, with part of the tine 114 broken away for illustration. The load wheel 116 rotates on an axis 118 at the end of an arm 130 which pivots about an axis 120 that is fixed to the tine 114. The arm 130 extends rearwardly of the axis 120 to form an axle 124 of the side wheel 122. The side wheel 122 is rotatable about the axle 124. The arm 130 is also connected to a push rod 126. The push rod 126 is pivotably secured to the arm 130 at a pivot point 128 that is rearward and upward of the axis 120. In a fairly known manner, the push rod 126 can, by forward motion, cause the load wheel 116 to deploy downward and lift the tine 114. By rearward motion, the push rod 126 can cause the load wheel 116 to retract upward into the tine 114, lowering the tine 114 relative to the floor.

Figure 16:
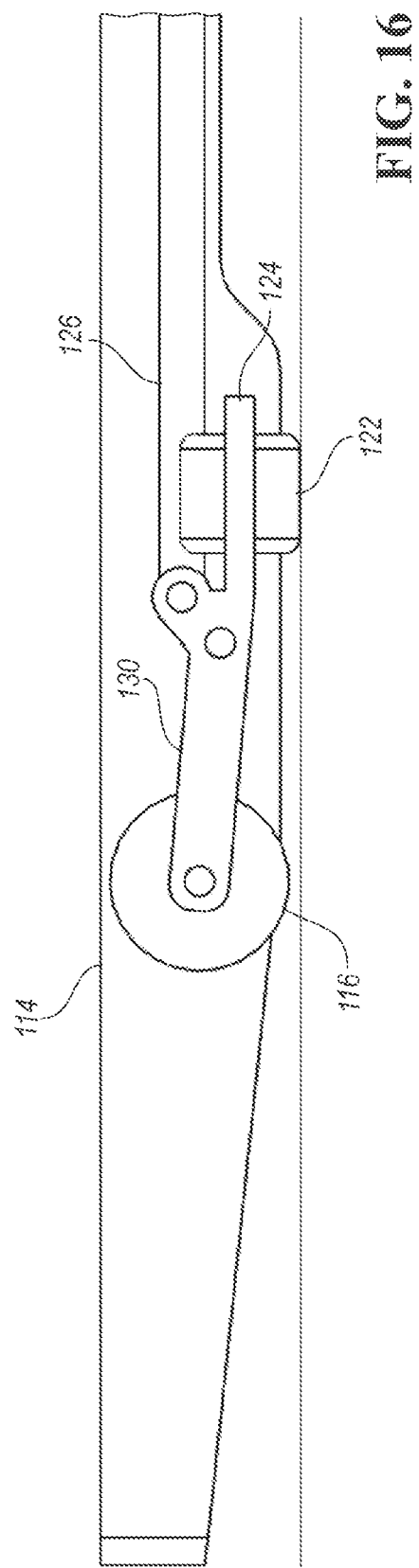
FIG. 16 shows the tine of FIG. 15 in the side shifting position.
Figure 17:
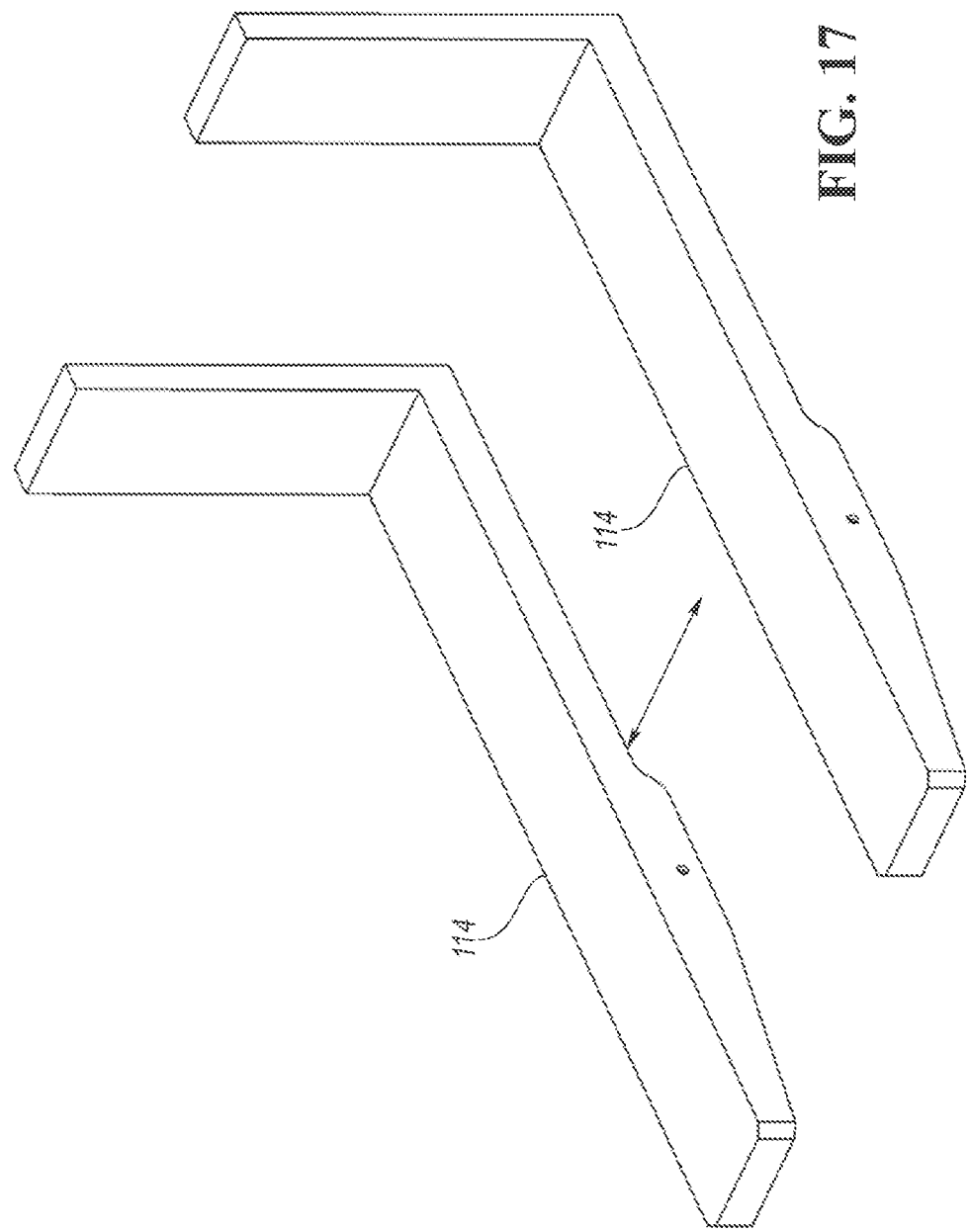
FIG. 17 shows the tines of FIG. 13 in the spaced apart position.

Referring to FIG. 16, in this embodiment, further rearward movement of the push rod 126 causes the load wheel 116 to retract further upward into the tine 114 and causes the axle 124 of the side wheel 122 to pivot downward until the side wheel 122 contacts the floor and the load wheel 116 does not. In this position, the tine 114 can be moved in a lateral direction, rolling on the side wheel 122, without wear or damage to the load wheel 116 or floor. For example, referring to FIG. 17, as before, the tines 14 can be moved further apart from one another as shown, or back toward one another. By deploying the side wheel 122 in each tine 114, the tines 114 can roll on the floor without causing damage or wear to the load wheels 116 or the floor.

Figure 18:
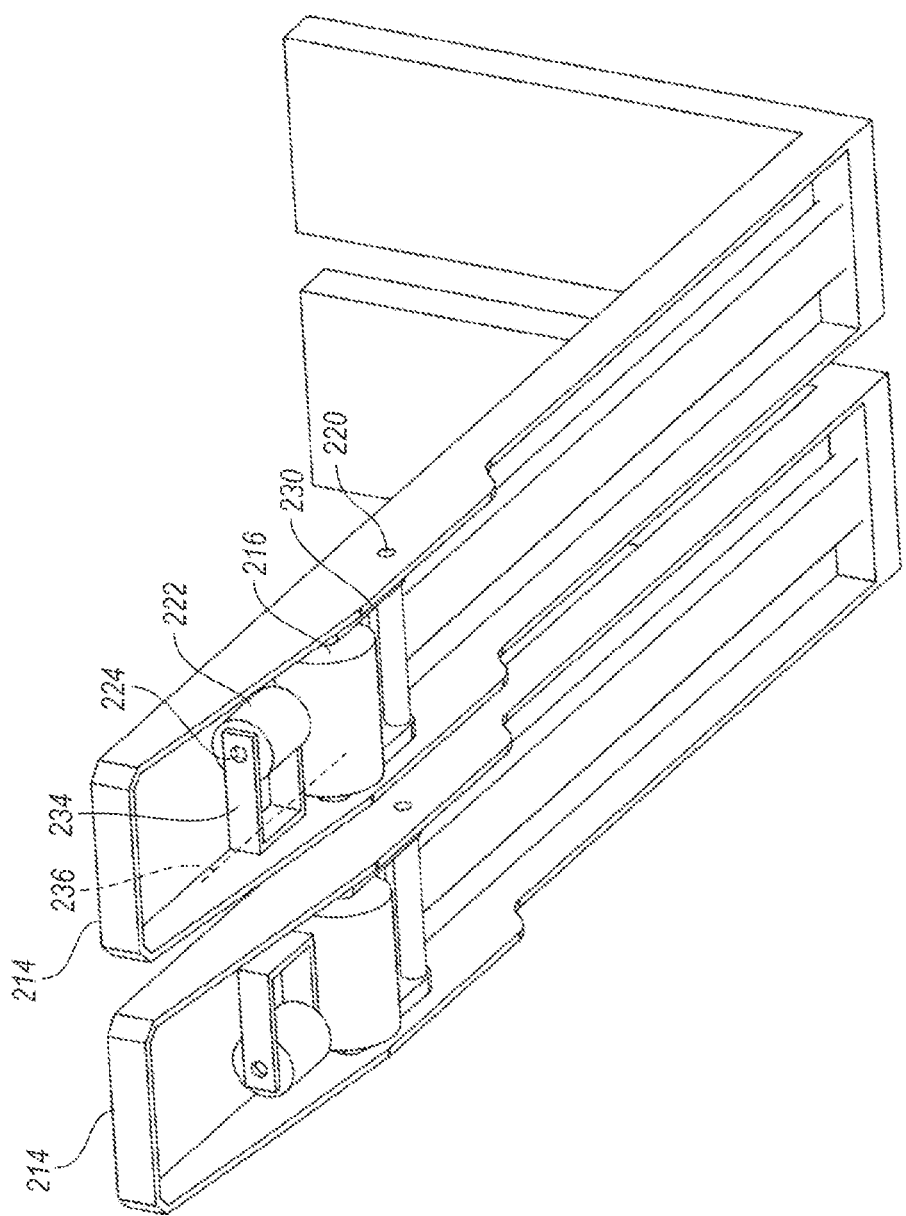
FIG. 18 is a bottom perspective view of a pair of tines that can be used in the pallet jack of FIG. 1.

FIGS. 18-21 show a tine 214 according to a third embodiment. Referring to FIG. 18, each tine 214 includes a load wheel 216 and a side wheel 222. The load wheel 216 is at the end of an arm 230 pivotable about an axis 220 fixed to the tine 214. The side wheel 222 is rotatable about an axis 224 at the end of arms 234. The opposite ends of arms 234 are pivotable about an axis 236 generally parallel to the long axis of the tine 214. The arms 234 can be pivoted by a second push rod acting upon a cam adjacent the arms 234, or a rotatable rod extending back to the base. The rotation of the arms 134 can be accomplished by hydraulics, pneumatics, electric motor, or manual operation of some linkage.

Figure 19:
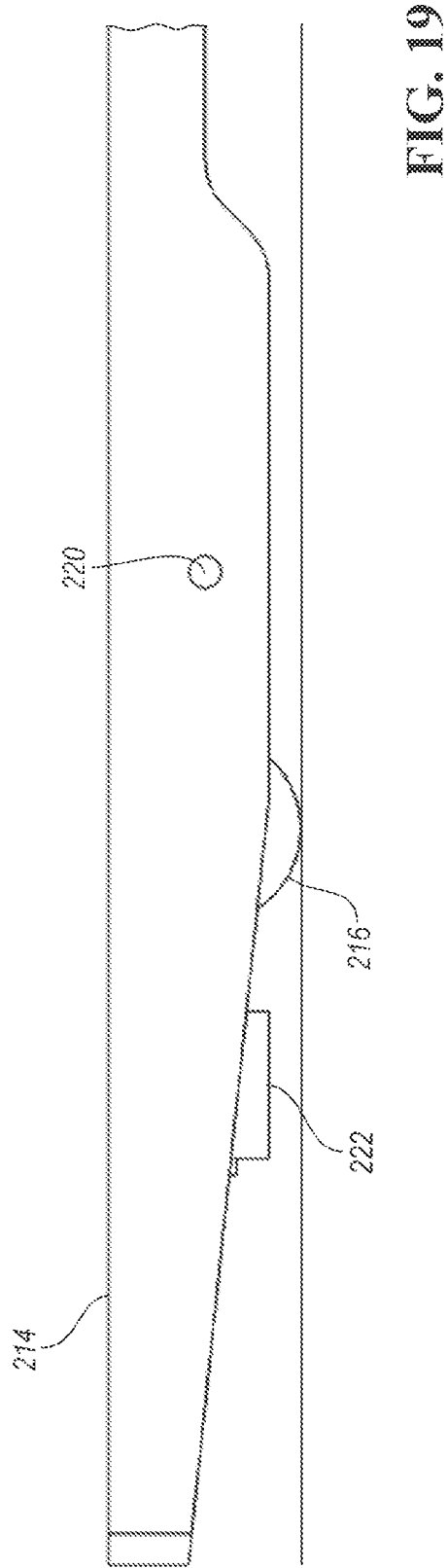
FIG. 19 is a side view of the tines of FIG. 18.

FIG. 19 is a side view of one of the tines 214 of FIG. 18. In this position, the load wheel 216 contacts the floor and the side wheel 222 is in a retracted position spaced off of the floor.

Figure 20:
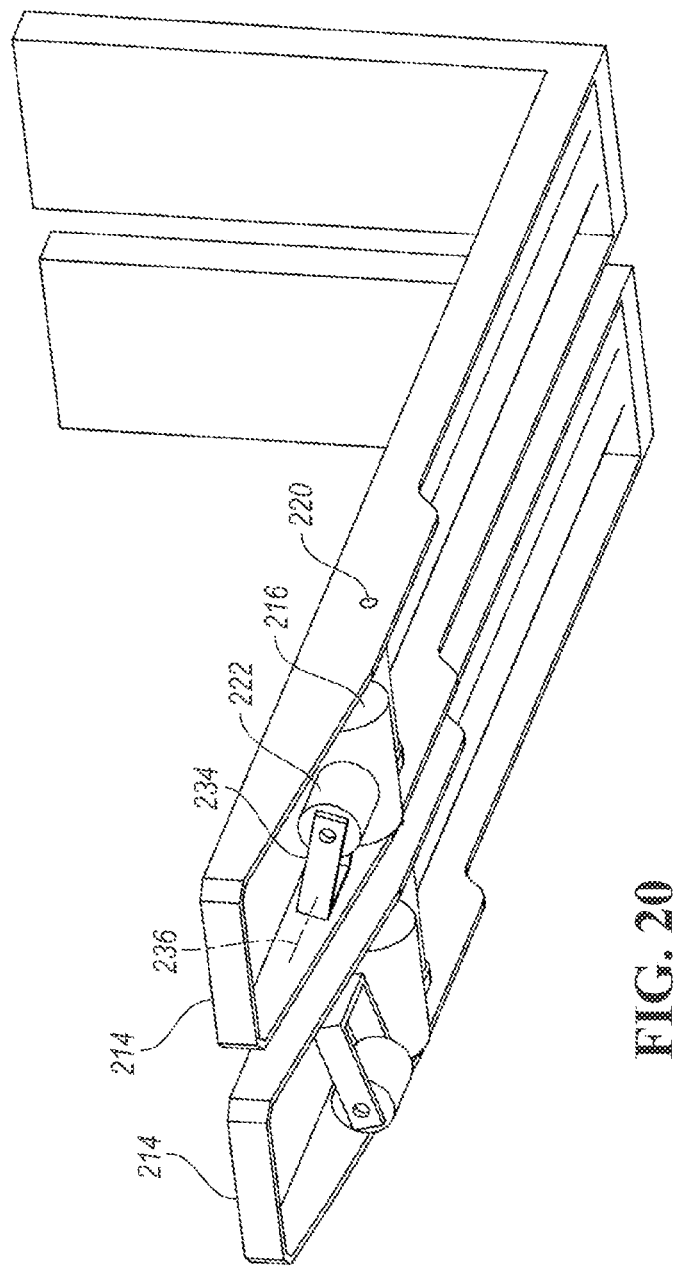
FIG. 20 is a bottom perspective view of the tines of FIG. 18 with the side wheels in the deployed position.

FIG. 20 is a bottom perspective view of the tines 214. FIG. 20 shows the side wheels 222 pivoted downward to their deployed position, lower than the load wheels 216. The arms 234 are pivoted downward about the axis 236, which causes the side wheels 222 to pivot downward into contact with the floor, lifting the load wheels 216 off the floor. The tines 214 can then be moved toward and away from each other, as above.

Figure 21:
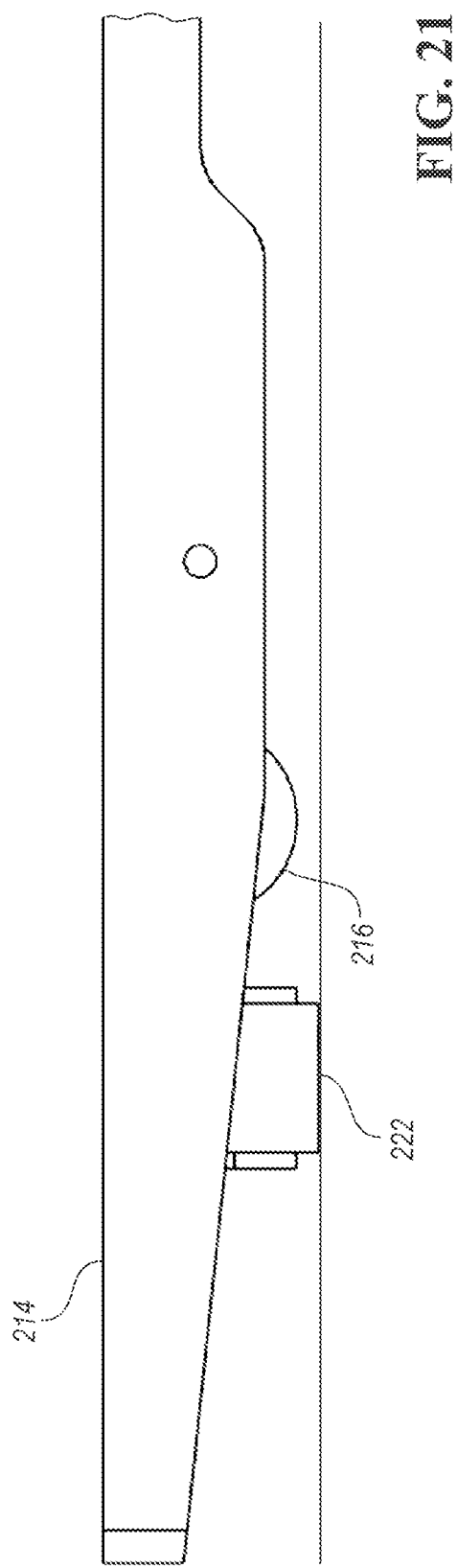
FIG. 21 is a side view of the tines of FIG. 20.

FIG. 21 shows the tine 214 with the side wheel 222 in the deployed position, contacting the floor, and lifting the load wheel 216 off of the floor. In this position, the tine 214 can be moved laterally inward or outward, toward or away from the other tine 214 without damage to the load wheels 216 or the floor.

Figure 22:
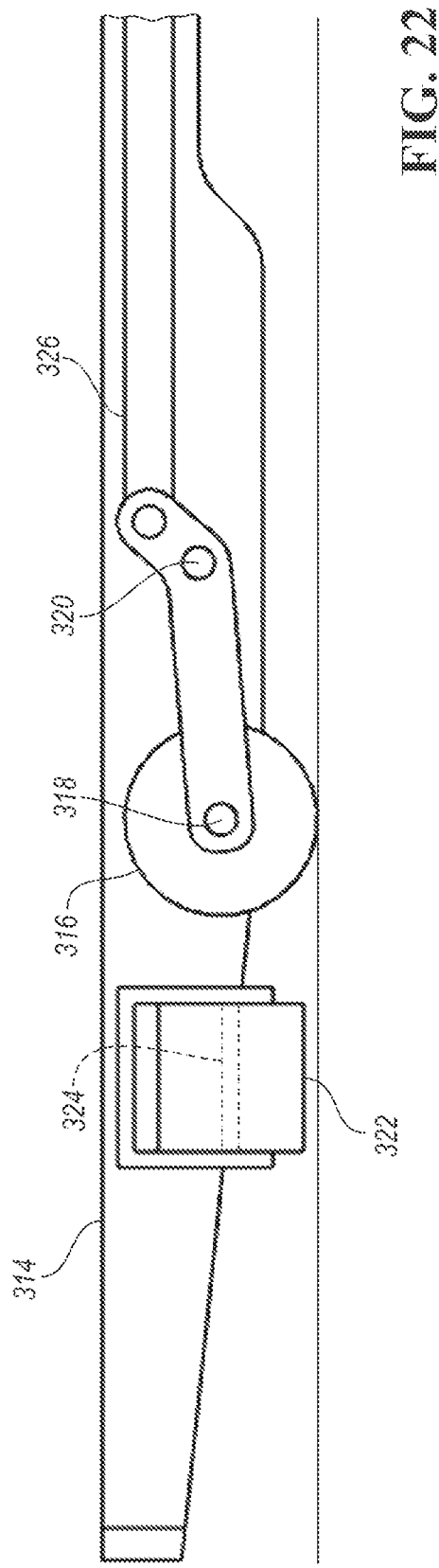
FIG. 22 is a side view of a tine, partially broken away, that can be used in the pallet jack of FIG. 1.
Figure 23:
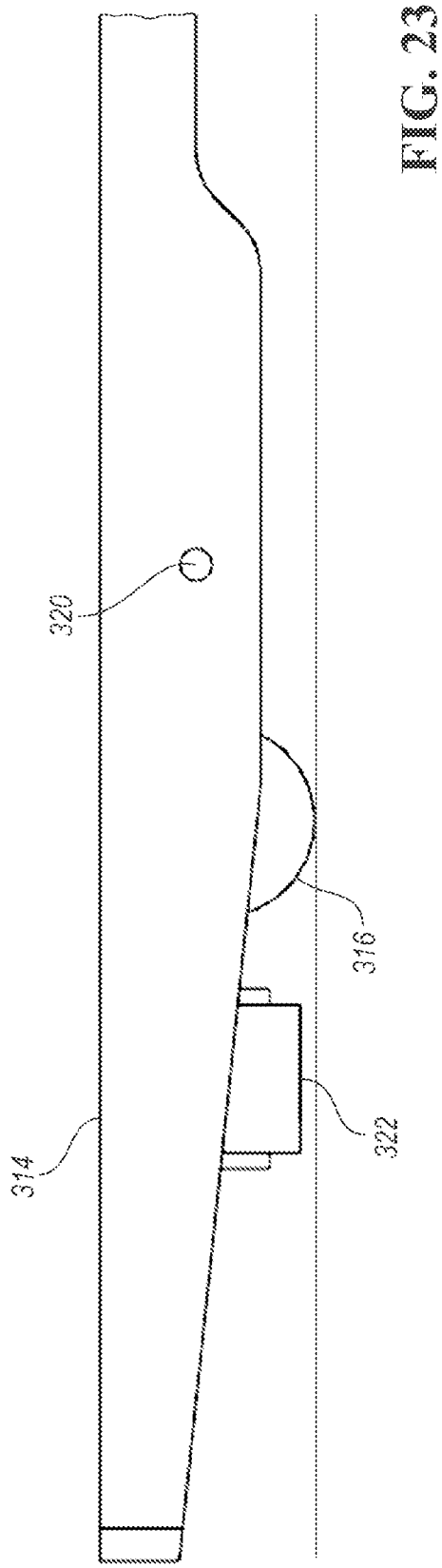
FIG. 23 is a side view of the tine of FIG. 22.
Figure 24:
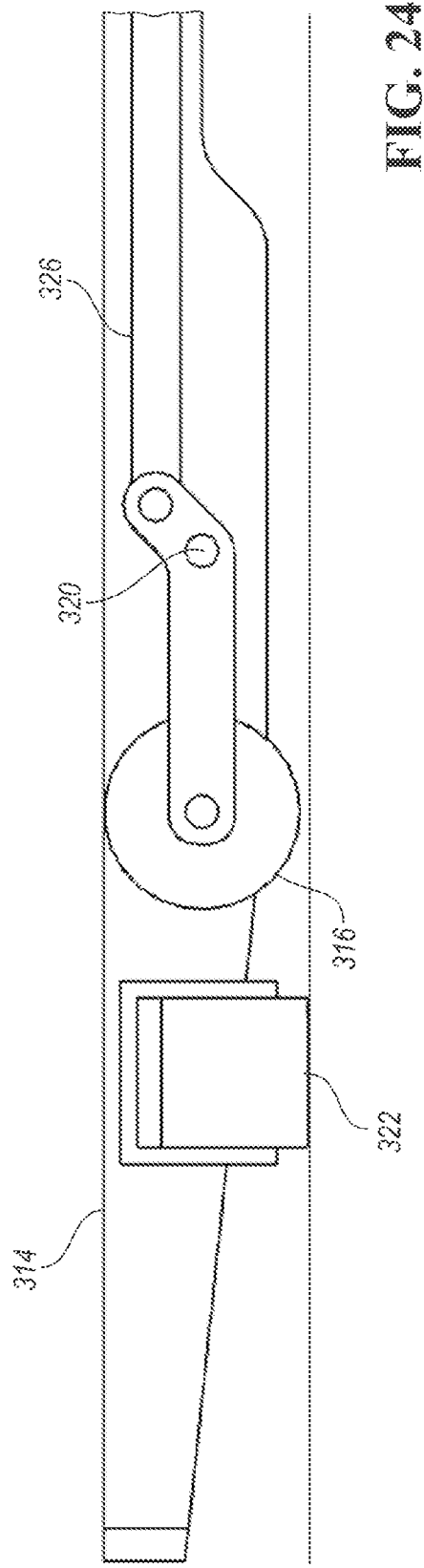
FIG. 24 shows the tine of FIG. 23, in the side shifting position.

FIGS. 22-24 show a fork tine 314 according to a third embodiment. Referring to FIG. 22, the tine 314 includes a load wheel 316 again deployable about an axis 320 spaced rearward of the load wheel 316. Referring to FIG. 23, in this embodiment, the side wheel 322 is rotatable about an axle 324 that is parallel to the long axis of the tine 314 and which does not move relative to the tine 314. The side wheel 322 and its axle 324 are at a fixed, constant height relative to an upper most surface of the tine 314. The axle 324 does not deploy and retract, as in the previous embodiments. Rather, it remains fixed. When the load wheel 316 is retracted sufficiently, the side wheel 322 will be lower than the load wheel 316, as shown in FIG. 24 such that the tine 314 will roll laterally on the side wheel 322. Alternatively, the side wheel 322 in this embodiment could be replaced with a caster wheel, i.e. the axis of rotation of the wheel 322 is pivotable about a vertical axis perpendicular to the tine 314.

FIGS. 25 and 26 show a pair of tines 414 that could be used in the pallet jack disclosed above with respect to FIGS. 1-11. The tines 414 each include a load wheel 416 that operates as before, leveraging the tines 414 up and down on the floor. The tines 414 each further include a slide 422 instead of the side wheel in the previous embodiments. The slide 422 may be PTFE or some other wearable "slippery" polymer material, or the slide 422 may be metal. The slide 422 may replace any of the side wheels in any of the above embodiments. Alternatively, as shown in FIG. 27, the slide 422 may be independently deployed by an independently activated deployment mechanism 424 (such as hydraulic, mechanical, electrical). With the slides 422 deployed and the load wheels 416 lifted off the floor, the tines can be moved toward and away from one another.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A pallet jack comprising:
 a base;
 a pair of tines extending from the base, the pair of tines including a first tine and a second tine;
 a load wheel supporting an outer end of each of the pair of tines, wherein each load wheel is configured to move toward and away from the respective tine to raise the tine off a floor on which the load wheel is supported; and
 the first tine including a support surface configured to selectively be a lowermost surface of the tine to facilitate lateral displacement of the first tine.

2. The pallet jack of claim 1 wherein the pair of tines are selectively movable laterally toward and away from one another.

3. The pallet jack of claim 2 further including a push rod in each of the pair of tines, the push rod coupled to the respective load wheel, wherein movement of the push rod in a direction parallel to the respective tine causes the respective load wheel to move toward and away from the tine.

4. The pallet jack of claim 3 wherein movement of the push rod in the first tine causes the support surface to move toward and away from the tine such that the support surface contacts the floor.

5. The pallet jack of claim 4 wherein the support surface is a side wheel.

6. The pallet jack of claim 5 wherein the side wheel is rotatable on an axis perpendicular to an axis about which the load wheel of the first tine is rotatable.

7. The pallet jack of claim 6 wherein the side wheel is pivotable in a plane parallel to a vertical plane through the first tine.

8. The pallet jack of claim 7 wherein the side wheel is rotatably mounted to a side arm pivotable about the axis about which the load wheel of the first tine rotates.

9. The pallet jack of claim 4 wherein the support surface is a slide.

10. The pallet jack of claim 1 wherein the support surface is configured to be moved toward and away from the respective tine independently of the movement of the respective load wheel toward and away from the respective tine.

11. The pallet jack of claim 1 wherein the support surface is at a fixed distance from the tine.

12. The pallet jack of claim 11 wherein the support surface is a side wheel.

13. The pallet jack of claim 12 wherein the pair of tines are selectively movable laterally toward and away from one another.

14. The pallet jack of claim 13 further including a push rod in each of the pair of tines, the push rod coupled to the respective load wheel, wherein movement of the push rod in a direction parallel to the respective tine causes the respective load wheel to move toward and away from the tine.

\* \* \* \* \*

UNITED STATES PATENT AND TRADEMARK OFFICE
CERTIFICATE OF CORRECTION

PATENT NO. : 11,685,417 B2
APPLICATION NO. : 17/583405
DATED : June 27, 2023
INVENTOR(S) : Kalinowski Page 1 of 1

It is certified that error appears in the above-identified patent and that said Letters Patent is hereby corrected as shown below:

In the Claims

Claim 1, Column 6, Line 41, change "tine" to --first tine--

Claim 3, Column 6, Line 50, change "tine" to --respective tine--

Claim 4, Column 6, Line 53, change "tine" to --first tine--

Claim 10, Column 7, Lines 3 and 4 to 5, change "respective tine" to --first tine--

Claim 10, Column 7, Line 4, change "respective load" to --load--

Claim 11, Column 7, Line 7, change "tine" to --first tine--

Claim 14, Column 7, Line 17, change "tine" to --respective tine--

Signed and Sealed this
First Day of August, 2023

Katherine Kelly Vidal
*Director of the United States Patent and Trademark Office*